United States Patent [19]

Fukumoto et al.

[11] Patent Number: 5,047,615
[45] Date of Patent: Sep. 10, 1991

[54] BAR CODE PRINTING OR READING APPARATUS

[75] Inventors: Mituo Fukumoto; Tokuya Kondo, both of Takarazuka; Takuji Yasumoto, Moriguchi; Syunji Tanaka, Osaka; Mikio Kitashiro, Nishinomiya, all of Japan

[73] Assignee: Furuno Electric Co., Limited, Nishinomiya, Japan

[21] Appl. No.: 593,479

[22] Filed: Oct. 1, 1990

Related U.S. Application Data

[63] Continuation of Ser. No. 196,681, May 20, 1988, abandoned.

[30] Foreign Application Priority Data

May 20, 1987 [JP] Japan .................................. 62-75824
May 20, 1987 [JP] Japan .................................. 62-75825
May 20, 1987 [JP] Japan .................................. 62-75826

[51] Int. Cl.⁵ .......................... G06K 7/10; G06K 7/01
[52] U.S. Cl. ..................................... 235/432; 235/472; 235/375
[58] Field of Search ............... 235/432, 419, 462, 472, 235/488, 380, 379, 375, 383, 385

[56] References Cited

U.S. PATENT DOCUMENTS

| | | |
|---|---|---|
| 4,251,798 | 2/1981 | Swartz et al. ..................... 235/472 |
| 4,415,065 | 11/1983 | Sandstedt .......................... 235/383 |
| 4,418,277 | 11/1983 | Tremmel et al. ................. 235/419 |
| 4,423,319 | 12/1983 | Jacobsen ........................... 235/419 |
| 4,575,621 | 3/1986 | Dreifus .............................. 235/380 |
| 4,634,845 | 1/1987 | Hale et al. ........................ 235/379 |
| 4,706,095 | 11/1987 | Ono et al. ......................... 235/432 |
| 4,706,096 | 11/1987 | Sato .................................. 235/432 |
| 4,727,245 | 2/1988 | Dobbins et al. .................. 235/472 |
| 4,734,710 | 3/1988 | Sato et al. ........................ 235/432 |
| 4,746,932 | 5/1988 | Sato .................................. 235/432 |

FOREIGN PATENT DOCUMENTS

| | | |
|---|---|---|
| 0199201 | 10/1986 | European Pat. Off. . |
| 61-259937 | 11/1986 | Japan . |
| 61-259938 | 11/1986 | Japan . |
| 61-259939 | 11/1986 | Japan . |
| 61-259940 | 11/1986 | Japan . |
| 62-4046 | 1/1987 | Japan . |

OTHER PUBLICATIONS

United Kingdom Search Report, Aug. 8, 1988.

*Primary Examiner*—Stuart S. Levy
*Assistant Examiner*—Robert Weinhardt

[57] ABSTRACT

The present invention relates to a bar code printing or reading apparatus that includes a hand-held bar code printer and a portable computer or a bar code reader connected to a side of the computer. The bar code printer has a front horizontal surface and vertical plates to form a concave or recessed portion in which the portable computer is received. This recessed portion supports the computer. The portable computer and the bar code printer are optically coupled so that signals from the computer are optically transferred to the bar code printer and vice versa.

20 Claims, 9 Drawing Sheets

BAR CODE PRINTING OR READING APPARATUS

This application is a continuation of application Ser. No. 196,681 filed on May 20, 1988, now abandoned.

BACKGROUND OF THE INVENTION

The present invention relates to a bar code printing or reading apparatus comprising a portable terminal and controller unit and a hand-held bar code printer or a bar code reader. Particularly, the invention relates to a bar code printing and/or reading apparatus comprising a hand-held bar code printer supporting the portable terminal and controller unit on the front surface of the printer.

A bar code printing or reading apparatus is used in various management systems utilizing bar code information representing various data. Management systems employing bar code information are used, for example, in small shops or large stores as supermarkets. Labels having bar code indications printed thereon are fixed on articles or goods.

A bar code printing or reading apparatus is required, in some cases, to make a bar code label by printing bar code information, to read bar code information from a bar code label, and to collect and store bar code data obtained by reading bar code information. In other cases, the apparatus is required to read bar code information from bar code labels to obtain bar code data and to store the resultant bar code data. In still other cases, the apparatus is required to transfer the stored data to a host computer. In still further cases, the apparatus is required to make bar code labels or receive bar code signals supplied from a host computer and make bar code labels by printing bar codes based on the received signals.

SUMMARY OF THE INVENTION

Accordingly, an object of the present invention is to provide a bar code printing or reading apparatus which is capable of providing all the above-described functions.

Another object of the invention is to provide a bar code printing or reading apparatus comprising a portable terminal and controller unit having a bar code reader connected to a side thereof and a hand-held bar code printer supporting the portable terminal and controller unit on the front surface of the hand-held bar code printer.

A further object of the invention is to provide a bar code printing or reading apparatus in which portable computers of various different sizes can be used.

Still a further object of the invention is to provide a bar code printing or reading apparatus comprising a portable terminal and controller unit and a hand-held bar code printer supporting the portable terminal and controller unit on the front surface of the printer, with the portable terminal and controller unit being coupled to a host computer as desired.

According to one aspect of the present invention, the bar code printing or reading apparatus comprises (i) a portable terminal and controller unit having a bar code reader connected thereto, an electric power supplier for powering the terminal and controller unit, and transmitting means for transmitting bar code information; and (ii) a hand held bar code printer supporting the portable terminal and controller unit on the face thereof, having receiving means for receiving the bar code information, printing means for recording the bar code information on recording medium, and an electric power supplier for powering the printer.

BRIEF DESCRIPTION OF THE DRAWINGS

In the drawings.

Throughout the drawings, the same reference numerals are given to like components.

DETAILED DESCRIPTION OF THE PREFERRED EMBODIMENTS

Figure 1:
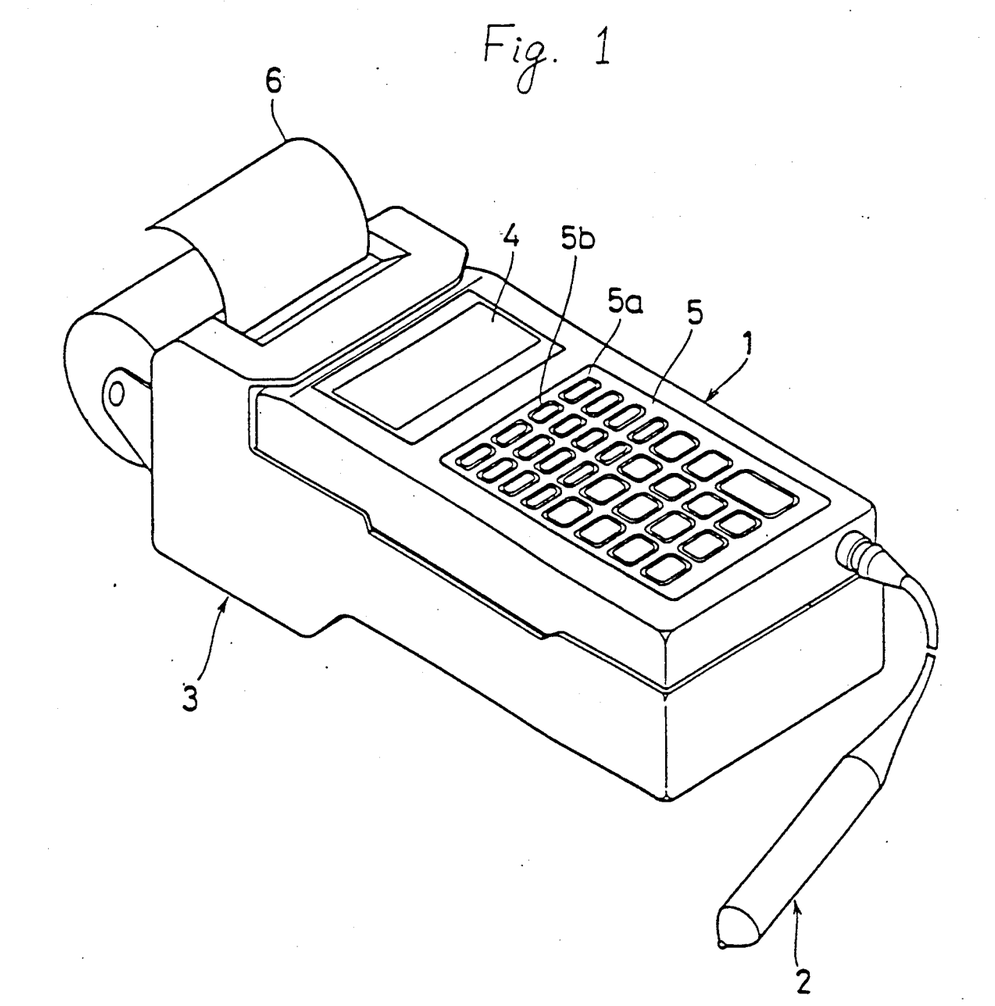
FIG. 1 shows a perspective view of an embodiment of a bar code printing or reading apparatus according to the present invention.

Referring to FIG. 1, a portable terminal and controller unit 1 is placed in a recessed portion of the hand held portion of a bar code printer 3 and is provided with a bar code reader 2 connected to the bottom side thereof by means of a flexible connector. The portable terminal and controller unit 1 control the bar code printer 3 and the bar code reader 2, and, for example, comprises a portable computer. The bar code reader 2 includes an optical scanning device which projects light and receives reflected light. The case of the hand-held computer 1 is shaped in a form of rectangular perallelpiped. The face of the computer 1 is provided with a liquid crystal display 4 and a keyboard 5 which includes a four by four arrangement of sixteen smaller keys, fourteen larger keys and one large key. The portable computer 1 further includes internally a central processing unit (hereinafter referred to as "CPU"), a read-only memory (hereinafter referred to as "ROM"), a random-access memory (hereinafter referred to as "RAM") and a battery unit which powers the computer 1. The bar code printer 3 includes a thermal printer, a CPU, ROMs and RAMs for converting bar code information transmitted from the portable computer 1 into bar code signals, and a battery unit for independently powering the bar code printer 3. The portable computer 1 and the bar code printer 3 are provided with communication terminals for performing optical communications, i.e., optically transmitting and receiving bar code signals and command signals. The communication terminals are positioned at appropriate places of both of the portable computer 1 and the bar code printer 3 so that each of the terminals faces the other when the hand-held computer 1 is placed on the bar code printer 3.

Figure 2:
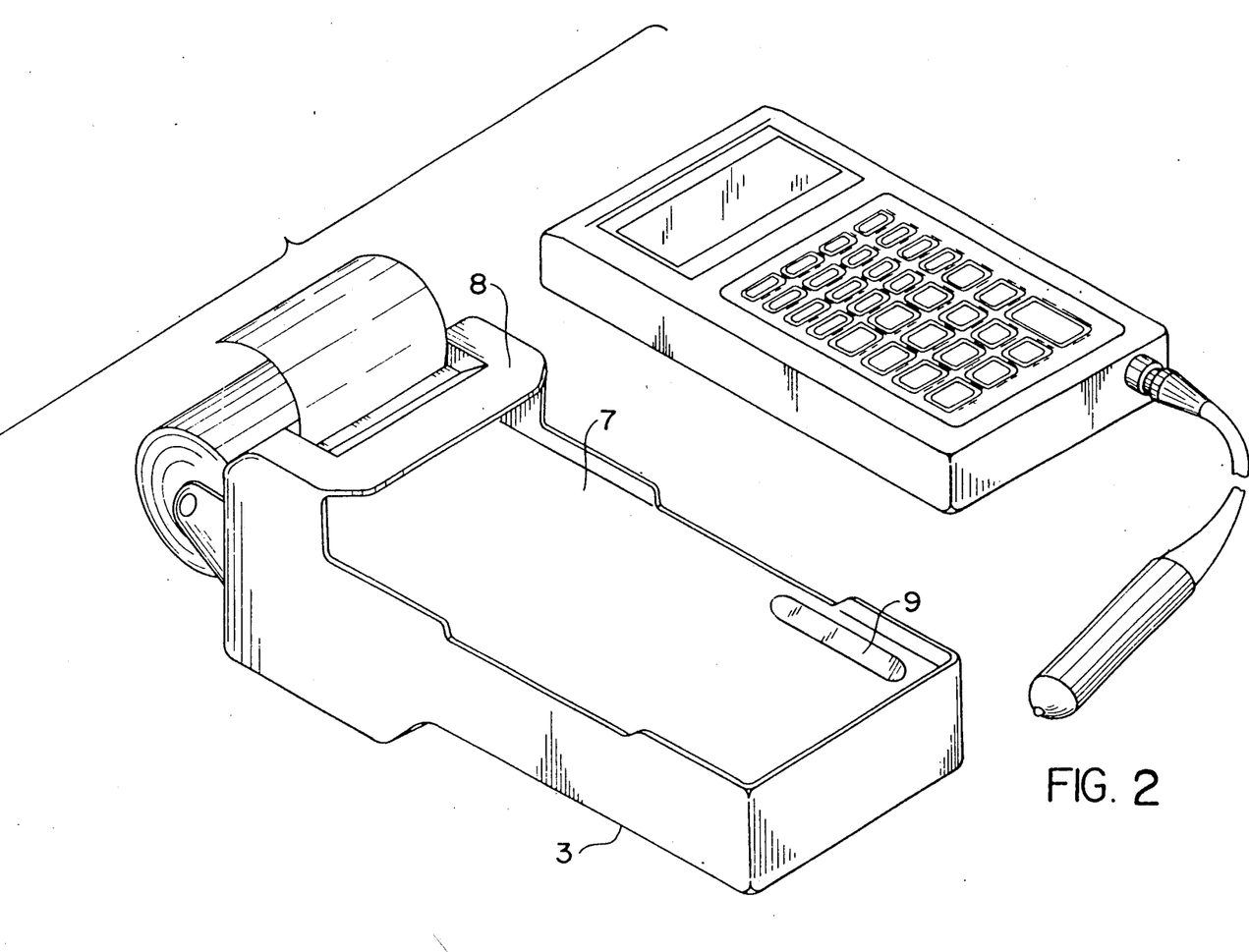
FIG. 2 shows a perspective view of the embodiment shown in FIG. 1, with the portable computer 1 being removed from the bar code printer 3.
Figure 3:
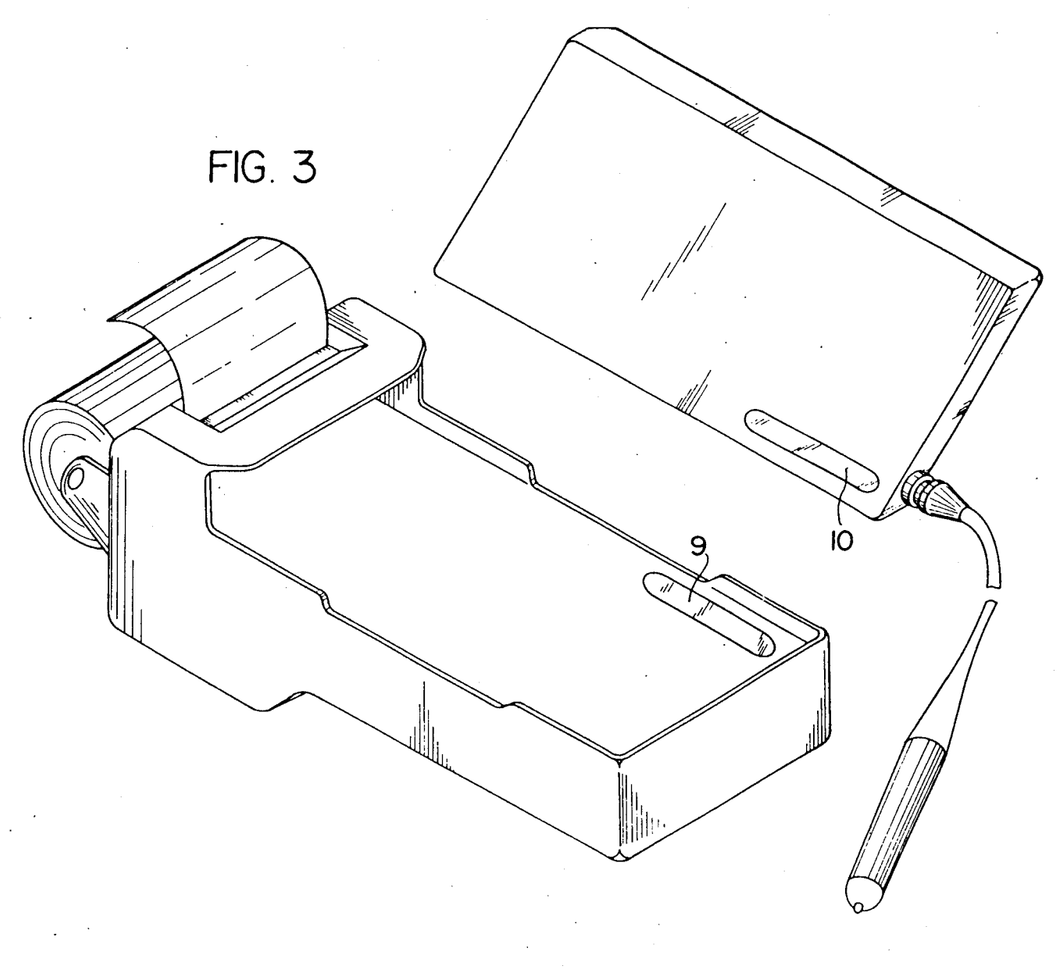
FIG. 3 shows a perspective view of the embodiment shown in FIG. 1, with the portable computer being removed from the bar code printer so that the communication terminals fixed at places in both of the computer and bar code printer are easily seen.

Referring to FIG. 2, the upper part of the bar code printer 3 is concave shaped to receive and securely support the hand held computer 1. The concave acceptor or receiver formed by extending the side plates of the bar code printer 3 beyond the horizontal front face thereof. The bar code printer 3 also has a retaining piece 8 extending over the upper front portion of the portable computer 1 with a narrow space therebetween, thereby firmly supporting the computer. On the front surface of the bar code printer 3 there is fixed a communication terminal 9, while a communication terminal 10 is fixed on the rear surface of the portable computer 1. Each of the communication terminals 9 and 10 includes a plurality of light-receiving elements and light-emitting elements arranged in a manner that one of the communication terminals 9 and 10 faces the other when the handheld computer 1 is placed on the bar code printer 3 as shown in FIG. 1. As will be explained in detail later, the communication terminals 9 and 10 are respectively connected to the electric circuits through communication interfaces for optical communication between the printer 3 and the computer 1. Data transfer from the portable computer 1 to the bar code printer 3 is performed through the communication terminals while the hand-held computer 1 is placed on the bar code printer 3 and the communication terminals face with each other. It should be noted that the bar code printer 3 is also capable of supporting the portable computer 1 without its retaining piece 8.

Figure 4:
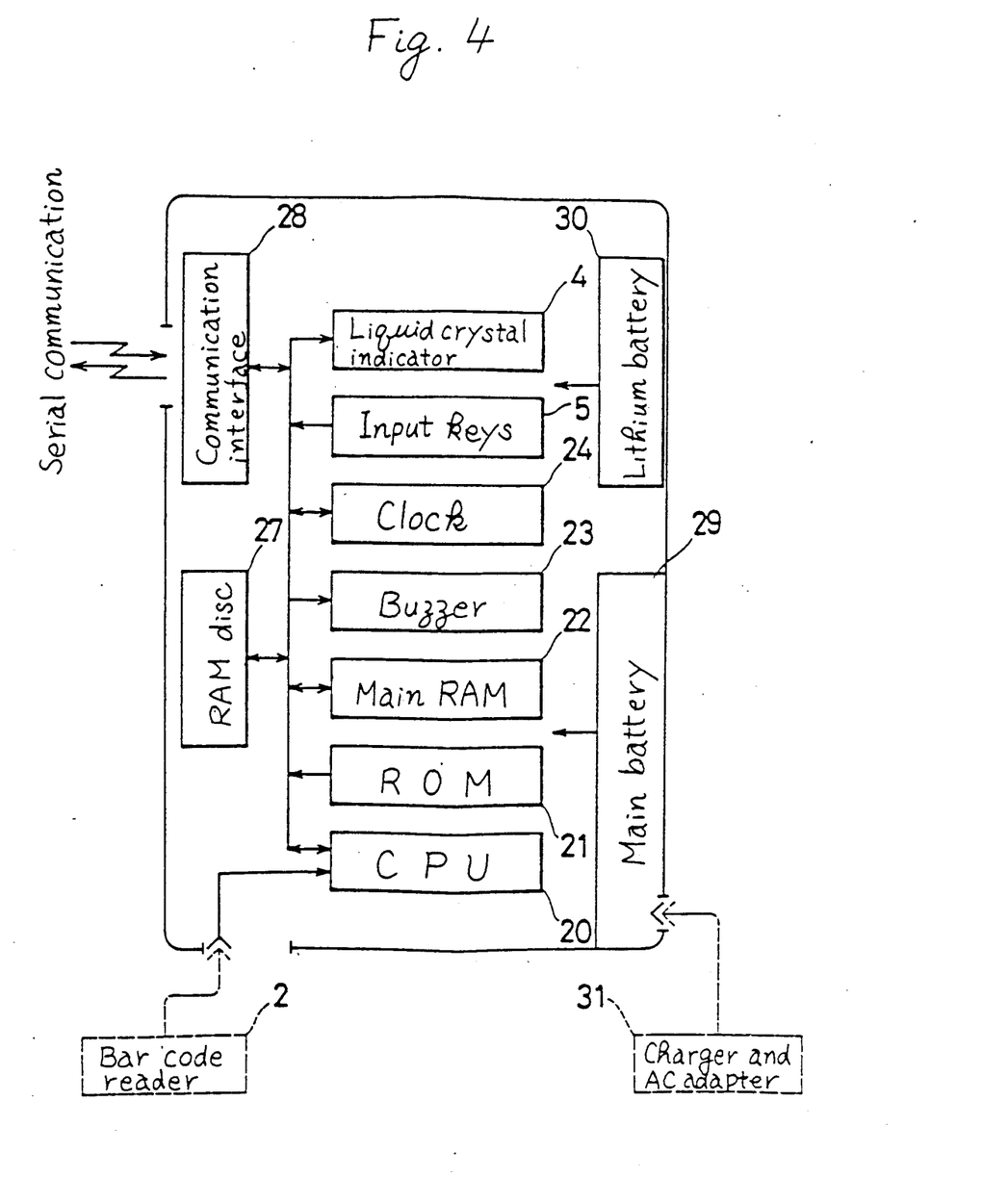
FIG. 4 shows the block diagram of the portable computer shown in FIG. 1.

Referring to FIG. 4, a CPU 20 is connected to a ROM 21, a main RAM 22, a buzzer 23, a clock 24, input keys 5 comprising 31 keys, a liquid crystal display indicator 4, a RAM disc 27 having a large capacity and a communication interface 28 for light coupling. A main battery unit 29 and a lithium battery 30 are also included in the case of the portable computer 1. The main battery unit 29 is possibly connected to an external charger and AC adapter 31. The lithium battery 30 supplies electric power to the memories when the electric power from the main battery unit 29 is not supplied. The buzzer 23 produces confirmation sounds when an input key is depressed or produces warning sounds when an operational error occurs. The clock 24 produces information signals relating to the day of the week, data and the time in hours, minutes and seconds. These information signals are utilized when data is transferred between the portable computer 1 and a host computer, or are displayed on the indicator 4 when a specific mode is set. The RAM disc 27 is used to store a plurality of bar code information signals transmitted from the bar code reader 2. The bar code information stored in the RAM disc 27 is transferred through the interface to a host computer, as will be explained in detail later.

Figure 5:
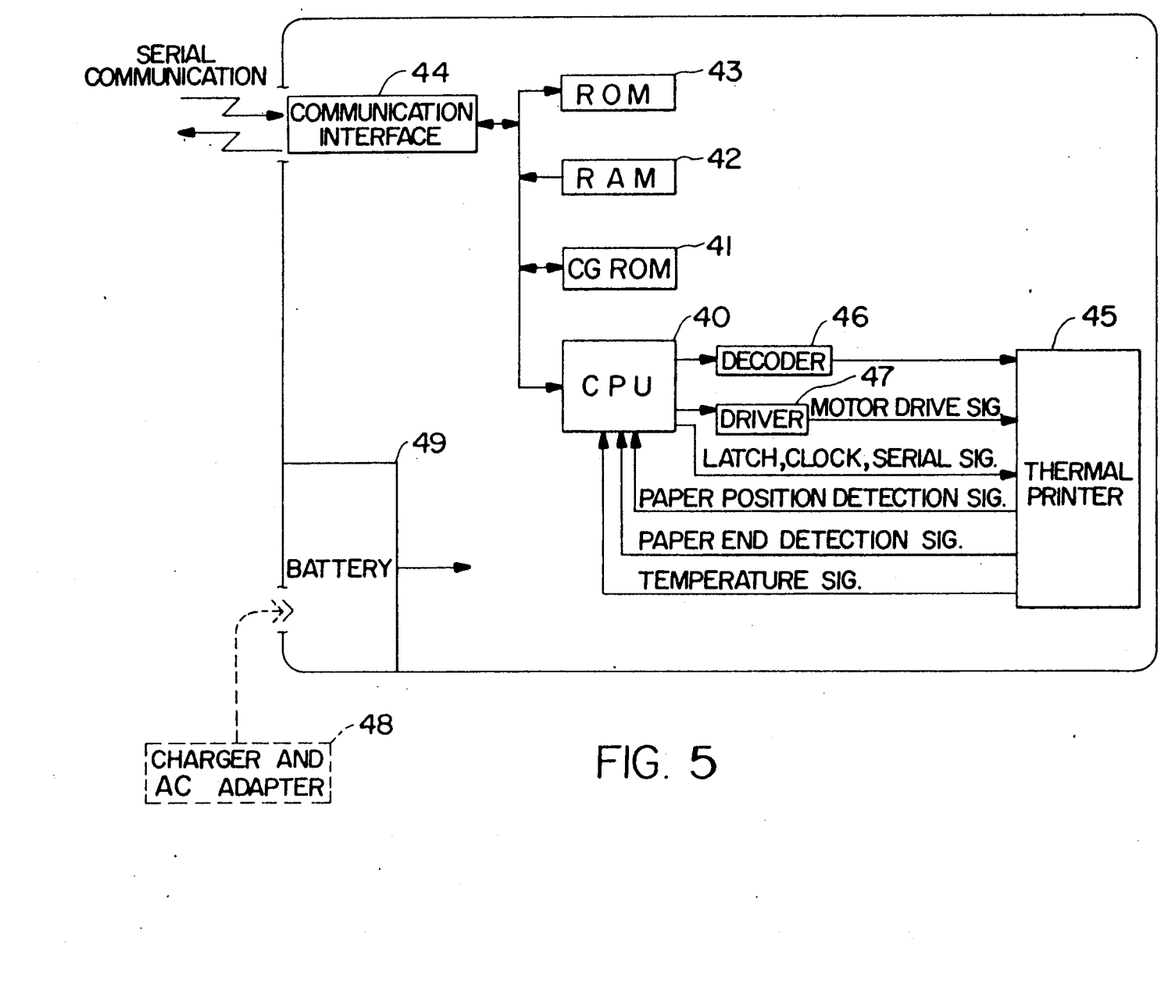
FIG. 5 shows the block diagram of the bar code printer shown in FIG. 1.

Referring to FIG. 5, the bar code printer 3 is also provided with a CPU 40. The CPU 40 converts data from the portable computer 1 to bar code signals, transmits error signals to the computer 1, controls data transfer from the computer 1 to the printer 3, and controls the thermal printer and motor. The CPU 40 is connected to a CGROM 41 for producing signals representing characters to be printed, a RAM 42, a ROM 43 and a communication interface 44 for providing optical communication. The CPU 40 also provides the thermal printer 45 with strobe signals and motor driving signals through a decoder 46 and a driver 47, respectively, and supplies latch, clock and serial signals to the thermal printer 45. The serial data used for printing are written into shift-registers included in the thermal printer 45 in response to clock pulses. The data stored in the shift-registers are transferred to latch circuits when latch signals are received and are outputted to the thermal head in response to the strobe signals. The motor driving signals drive the motor moving the paper 6. The thermal printer 45 is provided with a sensor for detecting the position of the paper 6, a sensor for detecting the end portion of the paper, and a thermistor for detecting the temperature of the thermal head with respect to a predetermined temperature. The output signals from the sensors and thermistor are supplied to the CPU 40. The CPU 40 controls the driving of the thermal printer 45 based on these output signals or determines whether an error has occurred to produce an error signal to be transmitted to the portable computer 1 through the communication interface 44. A battery unit 49 is included which powers the bar code printer 3 being driven even when the printer 3 is being carried. The battery unit 49 may be connected to a charger and AC adapter 48.

Figure 6:
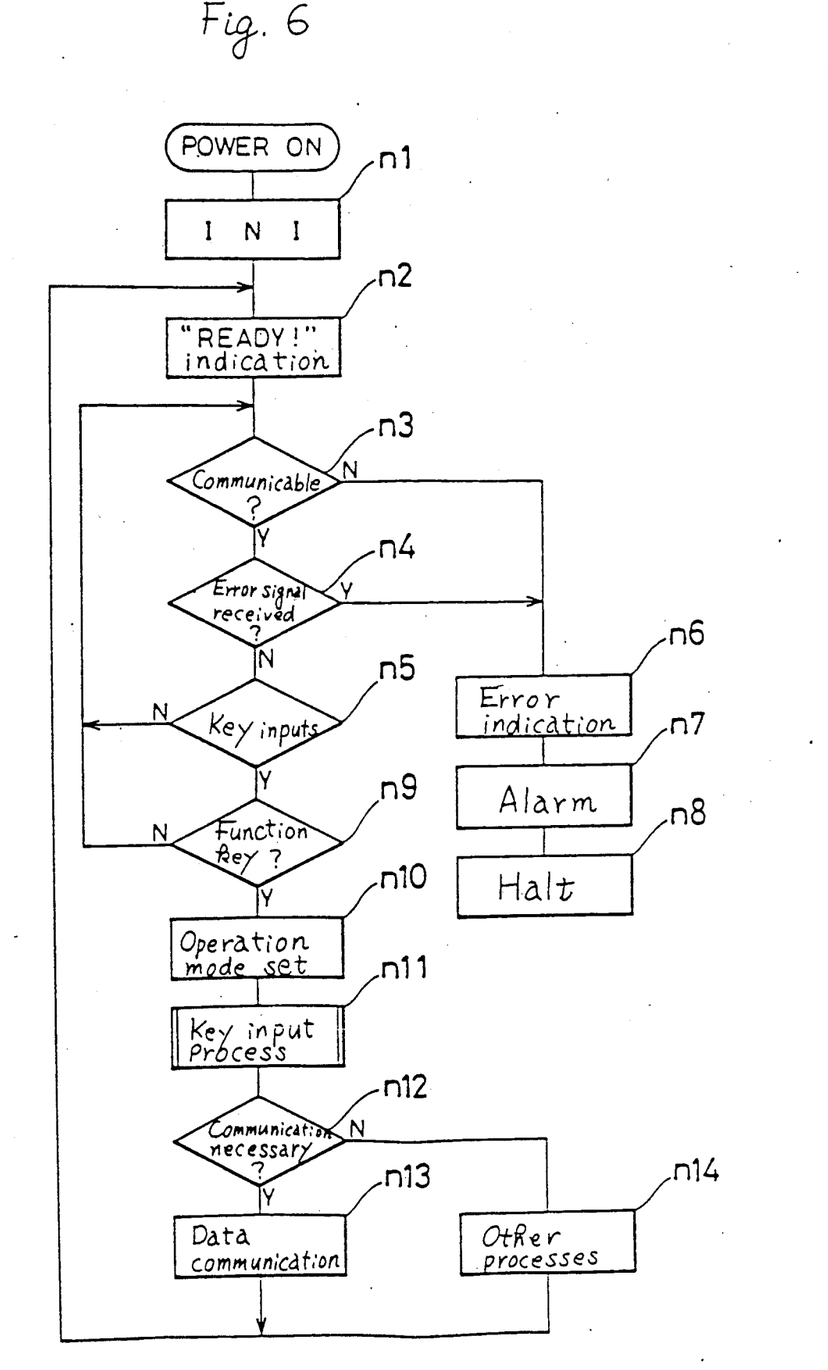
FIG. 6 shows a flow chart for illustrating the operation of the hand-held computer.

Referring to FIG. 6, an initial process is performed at a step "n1" when the electric power supply is switched on. At a step "n2", READY indication state is realized to receive key inputs. At a step "n3", whether the bar code printer 3 is communicable is determined. At a step "n4", it is determined whether an error signal is received from the bar code printer 3. At a step "n5", it is determined whether key inputs are made. When the bar code printer 3 is not powered by the battery unit 49, an operation of the computer 1 specified at a step "n6" is performed after the operation at the "n3" is completed, since the communication between the portable computer 1 and the bar code printer 3 is impossible. In this case, an ERROR indication is realized at the step "n6"; at a step "n7", an alarm is produced; and at a step "n8", the computer 1 is interrupted. Also, when an error signal is received from the bar code printer 3, the operations specified at the steps "n6" through "n8" are successively performed. The error signal is produced when the voltage level of the battery unit is lower then a predetermined level, or when the paper runs out. When an input key is depressed, an operation specified at a step "n9" is executed to determine whether the depressed key is a function key or not.

When a function key is depressed at the step "n9", an operational mode corresponding to the function key is set. Some of the operation modes, are a bar code printing mode, a graph printing mode, a character printing mode and a data transmission mode for transferring data to the host computer, etc. At a step "n11", the computer 1 is provided with input signals by means of some of the keys depending on an operational mode established. If a communication process is desired, data communication is realized between the portable computer 1 and the bar code printer 3, at a step "13". If the communication process is not desired other processes are realized at a step "n14", and the operational sequence returns to the step "n2" to wait for new key inputs.

Figure 7:
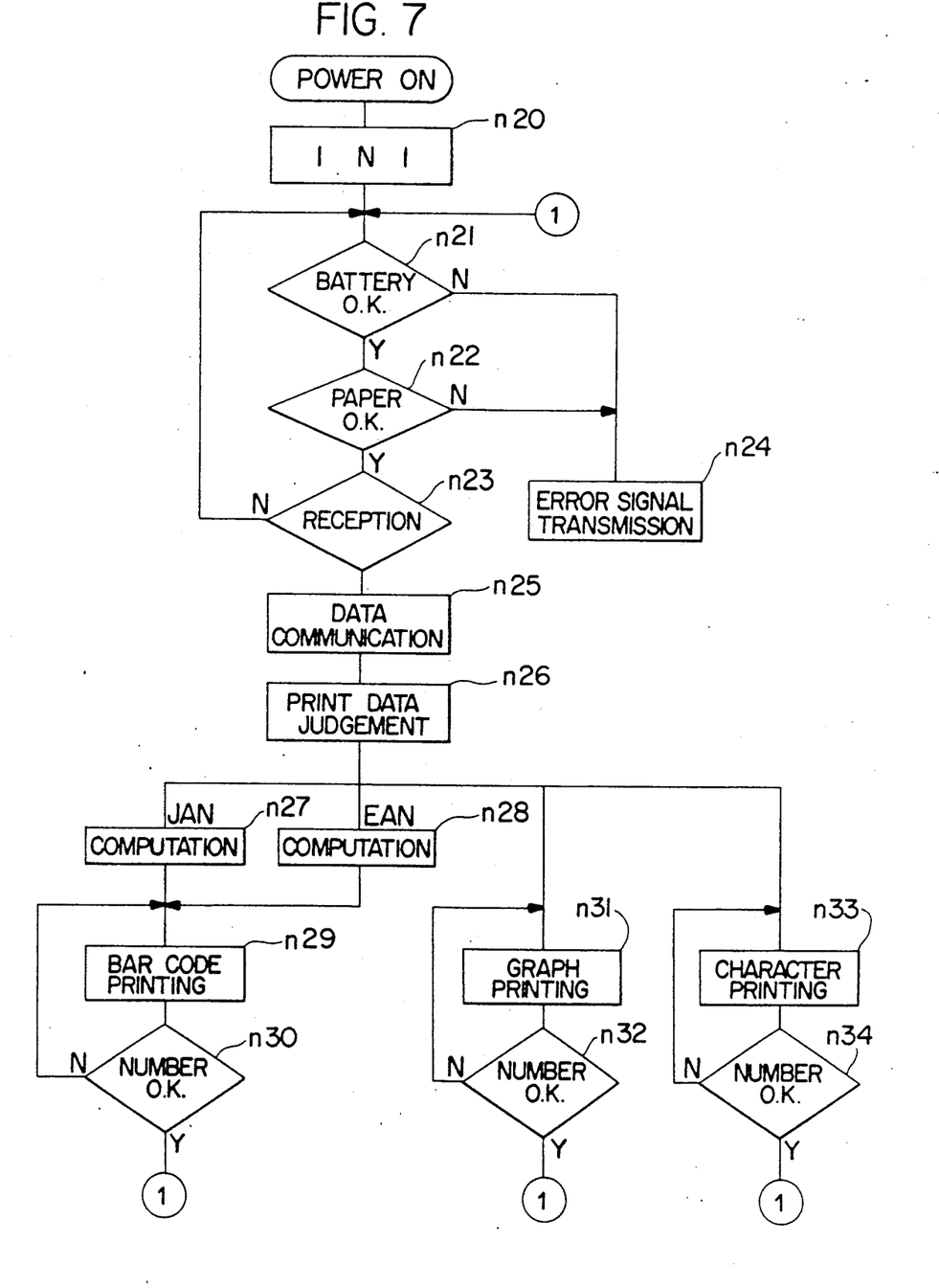
FIG. 7 shows a flow chart for depicting the operation of the bar code printer.

Referring to FIG. 7, an initial process is performed at a step "n20" when the electric power supply is switched on. At a step "n21", it is determined whether the battery unit is in order. At a step "n22", it is determined whether the paper has run out. At a step "n23", the bar code printer is in a ready state to receive data transmitted from the portable computer 1. When a command signal from the portable computer 1 is received, a corresponding data communication is made at a step "n25". At a step "n26", the kind of print data is determined. If a bar code printing is required, the print data are computed to be converted to bar code signals, at a step "n27", for each kind of the bar code. At steps "n29" and "n30", bar code printing is performed to produce bar code prints, with the number of the prints being specified by the data received. If a graph printing is to be made, the received data are directly used to be printed without any computation. If a character printing is to be made, the data from the CGROM 41 are used to be printed.

Figure 8:
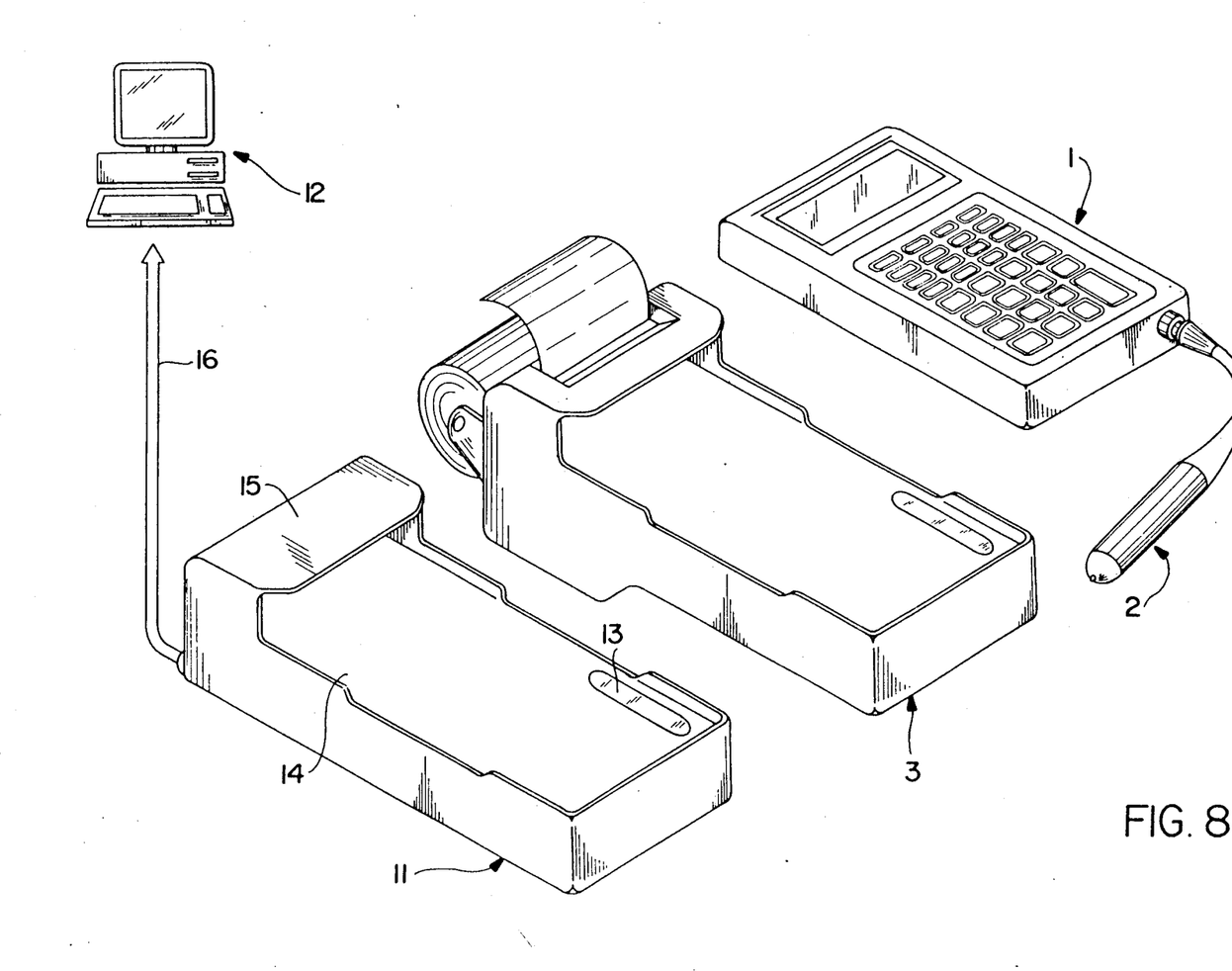
FIG. 8 shows another embodiment of a bar code printing or reading apparatus according to the invention.

Referring to FIG. 8, the bar code reading or printing apparatus explained above is further provided with an interface unit 11. The interface unit 11 is shaped in almost the same form as the bar code printer 3, but without the printer. The upper part of the interface unit 11 is shaped to accept and securely support the hand held computer 1. The concave acceptor 14 is formed by extending the side plates of the interface unit beyond the horizontal front face thereof. The interface unit 11 also has a retaining piece 15 extending over the upper front portion of the portable computer 1 with a narrow space therebetween, thereby firmly holding the computer 1. On the front surface of the interface unit 11 a communication terminal 13 is fixed, while the communication terminal 10 is fixed on the rear surface of the portable computer 1. The communication terminal 13 also includes a plurality of light-receiving elements and light-emitting elements and is arranged in a manner that the communication terminal 13 faces the communication terminal 10 when the hand held computer 1 is placed on the front surface of the interface unit 11. The interface unit 11 also includes communication interfaces for providing optical communication. The communication interface connected to the communication terminal 13 is directly connected to the communication interface which is connected to one end of a communication cable 16. The other end of the cable 16 is connected to a host computer 12. When the hand held computer 1 is placed on the interface unit 11, the computer communicates with the host computer 1 and the data stored in the computer 1 can be transferred to the host computer 12 without being processed in the interface unit 11.

With the arrangement shown in FIG. 8, when the portable computer 1 is placed in the concave acceptor 14 of the interface unit 11, bar code data can be transferred between the computer 1 and the host computer 12. While, when the computer 1 is placed in the concave acceptor of the hand held bar code printer 3, bar code data can be transferred to the printer 3 from the computer 1. Mere insertion of the hand held computer 1 into the concave acceptor either of the interface unit 11 or the printer 3 enables an optical coupling between the computer 1 and the host computer 12 or between the computer 1 and the printer 3.

It should be noted that although the interface unit 11 is used to couple the host computer 12 to the portable computer in the embodiment shown in FIG. 8, the host computer 12 can also be coupled to the portable computer 1 only through the bar code printer 3. In this case, the bar code printer 3 is further provided with two communication interfaces. One communication interface is connected to the communication terminal 9 and is connected to the other communication interface which is connected to one end of a communication cable 16. The other end of the cable 16 is connected to the host computer 12.

Figure 9:
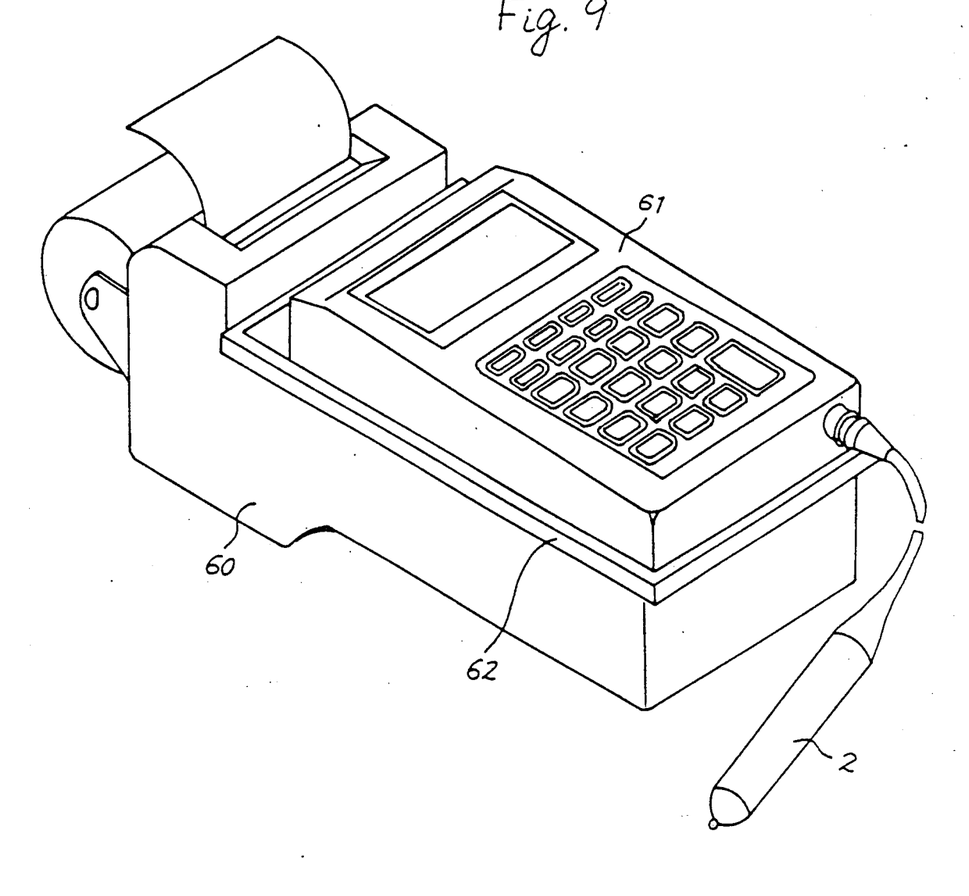
FIG. 9 shows a perspective view of an embodiment of a bar code printing or reading apparatus according to the present invention.

Referring to FIG. 9, a bar code printer 60 is the same as the printer 3 as shown in FIGS. 1 and 2 except that the printer 60 does not have the retaining piece 8. A hand-held computer 61 is the same as the computer 1 except that the computer 61 has fewer smaller keys i.e., eight keys. Thus, the length of the portable computer 61 is shorter than that of the computer 1. An interface unit 62 is inserted between the printer 60 and the hand-held computer 61.

Figure 10:
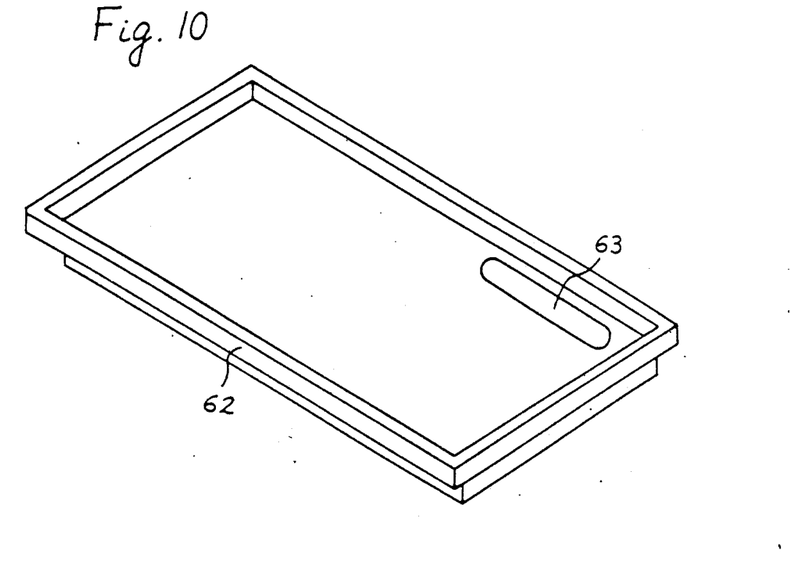
FIG. 10 shows a perspective view of an interface unit used in an embodiment according to the invention.

Referring to FIG. 10, the interface unit 62 has a base shaped in a form of rectangular parallelpiped, and has a concave acceptor thereon. The concave acceptor of the interface unit 62 is formed by four vertical plates on the base and the horizontal front face thereof. On the front surface of the interface unit 62 a communication terminal 63 is fixed, while another communication terminal 64 is fixed on the rear surface of the interface unit. Each of the communication terminals 63 and 64 includes a plurality of light-receiving elements and light-emitting elements. The base part of the interface unit 62 fits into the concave acceptor of the bar code printer 60. The portable computer 61 is placed in the concave acceptor of the interface unit 62. When the interface unit 62 is inserted between the bar code printer 60 and the portable computer 61 as shown in FIG. 9, the communication terminal 63 on the front surface of the interface unit 62 faces the communication terminal 10 on the rear surface of the computer 61, and the communication terminal 64 on the rear surface of the interface unit 62 faces the communication terminal 9 on the front surface of the bar code printer 60. Thus, the portable computer 61 having a shorter length as compared with that of the computer 1 shown in FIG. 1 is supported by the bar code printer 60 through the interface unit 62. In the same way, a hand-held computer having a different length can be supported by the front face of the bar code printer 60 through the interface unit 62. The portable computer 61 is optically coupled to the bar code printer 60 through the interface unit 62. Signals from the computer 61 are transferred through the communication terminal 10 thereof transferred through the communication terminal 10 thereof, the terminals 63 and 64 of the interface unit 62, and the terminal 9 of the printer 60, and vice versa. It should also be noted that portable computers of different sizes having various lengths and widths can be supported by the bar code printer 60 through an interface unit having a concave acceptor of a size having a length and a width determined by the size of a portable computer used.

It should be noted that although the portable computer and the hand-held bar code printer are optically coupled in the foregoing embodiments according to the present invention, they can also be electromagnetically coupled to each other.

While, the invention has been described in detail and with reference to specific embodiments thereof, it will be apparant to one skilled in the art that various changes and modifications can be made therein without departing from the spirit and scope of invention.

What is claimed is:

1. A bar code printing or reading apparatus comprising:
   a portable terminal including,
      a first face with keys,
      a bar code reader connected thereto, first electric power supply means for powering said portable terminal, and wireless transmitting means for transmitting bar code information, located on a second face of said portable terminal which is substantially parallel and opposite to said first face; and a hand held bar code printer including, a recessed portion for receiving and supporting said portable terminal on an upper face thereof, said upper face including wireless receiving means for receiving said bar code information, printing means for recording signals representative of said bar code information on a recording medium, and second electric power supply means for powering said hand held bar code printer.

2. The bar code printing or reading means as claimed in claim 1 wherein said portable terminal comprises a portable computer.

3. The bar code printing or reading means as claimed in claim 1 wherein said transmitting means and said receiving means optically transmits and receives said bar code information, respectively.

4. The bar code printing or reading apparatus as claimed in claim 1 wherein said first and second electric power supply means are batteries.

5. The apparatus of claim 1 wherein the bar code reader is connected to the portable terminal by a flexible connector.

6. The apparatus of claim 1 wherein the recessed portion includes walls extending from the upper face of the printer.

7. The apparatus of claim 6 wherein the printer is of substantially rectangular shape and there are plural walls extending on each side of the substantially rectangular shape along a longitudinal axis.

8. The apparatus of claim 7 wherein there is an uninterupted wall extending from the face of the printer along a width axis at one end of the upper printer face.

9. The apparatus of claim 8 wherein there is a concave portion opposite to said uninterruped wall.

10. The apparatus of claim 9 wherein said concave portion includes extending plates which extends from one of the plurality of walls.

11. A bar code printing or reading apparatus comprising:

a portable computer substantially shaped in a form of a rectangular parallel piped including, a display and keys on a first face thereof, a bar code reader connected thereto at a side thereof, first electric power supply means for powering said portable computer, and transmitting means for optically transmitting bar code information located on a second face of said portable computer which is substantially parallel and opposite to said first face; and a hand held bar code printer including, a concave recessed portion for receiving and supporting said portable computer on a face thereof, optical receiving means for receiving said bar code information, printing means for recording signals representative of said bar code information on a recording medium in response to control signals from said portable computer, and second electric power supply means for powering said hand held bar code printer.

12. A bar code printing or reading apparatus comprising:

a portable computer substantially shaped in a form of a rectangular parallel piped including, a display and keys on a first face thereof, a bar code reader connected thereto at a bottom side thereof, first electric power supply means for powering said portable computer, and first transmitting and receiving means for optically transmitting and receiving signals including signals representing bar code information located on a second face which is opposite to said first face; and a hand held bar code printer including, a concave recessed portion for receiving and supporting said portable computer on a face thereof, second transmitting and receiving means for optically transmitting signals and optically receiving signals, printing means for recording signals representative of said bar code information on a recording medium in response to the signals received, and second electric power supply means for powering said hand held bar code printer.

13. A bar code printing or reading apparatus comprising:

a portable computer including, a bar code reader connected thereto, first electric power supply means for said portable computer, and first transmitting means for transmitting g bar code information;

an interface including, first receiving means for receiving said bar code information, and second transmitting means for transmitting said bar code information; and a hand held bar code printer including, second receiving means for receiving said bar code information from said second transmitting means in said interface, second electric power supply means for powering said hand held bar code printer, printing means for recording said bar code information on a recording medium, and a recessed portion for receiving and supporting said portable computer and said interface, said interface being placed between said portable computer and said hand held bar code printer.

14. The apparatus of claim 13 wherein said interface further includes a concave acceptor for receiving the portable computer.

15. The apparatus of claim 14 wherein the concave acceptor includes side plates that extend from a horizontal front face of the interface.

16. The apparatus of claim 13 wherein said interface includes a top portion and a bottom portion which is smaller than the top portion.

17. The apparatus of claim 16 wherein said bottom portion can nest in said printer and said portable computer can nest in said top portion.

18. The apparatus of claim 16 includes side walls extending from an upper face of said interface.

19. The apparatus of claim 18 wherein said side walls are uninterrupted walls and totally surround an upper face of the interface.

20. A bar code printing apparatus for use with a host computer comprising:
controller means for receiving bar code information from the host computer and including,
first electric power supply means for powering said controller means, and
wireless transmitting means for transmitting signals including bar code signals; and
a hand held bar code printer including,
a recessed portion for receiving and supporting said controller means on an upper face thereof,
wireless receiving means for receiving said signals located on said upper face, second electric power supply means for powering said hand held bar code printer, and
printing means for recording signals representative of said bar code information on a recording medium.

* * * * *